US012003057B2

(12) United States Patent
Osawa

(10) Patent No.: US 12,003,057 B2
(45) Date of Patent: Jun. 4, 2024

(54) CONNECTOR WITH INNER AND OUTER HOUSINGS

(71) Applicant: SUMITOMO WIRING SYSTEMS, LTD., Mie (JP)

(72) Inventor: Kiyoshi Osawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 188 days.

(21) Appl. No.: 17/703,236

(22) Filed: Mar. 24, 2022

(65) Prior Publication Data

US 2022/0311169 A1 Sep. 29, 2022

(30) Foreign Application Priority Data

Mar. 25, 2021 (JP) ................................ 2021-051900

(51) Int. Cl.

| | |
|---|---|
| ***H01R 13/512*** | (2006.01) |
| ***H01R 13/42*** | (2006.01) |
| ***H01R 13/639*** | (2006.01) |
| ***H01R 13/6581*** | (2011.01) |
| ***H01R 13/74*** | (2006.01) |
| *H01R 11/11* | (2006.01) |

(52) U.S. Cl.
CPC ........... *H01R 13/512* (2013.01); *H01R 13/42* (2013.01); *H01R 13/639* (2013.01); *H01R 13/6581* (2013.01); *H01R 13/748* (2013.01); *H01R 11/11* (2013.01)

(58) Field of Classification Search
CPC .... H01R 13/512; H01R 13/42; H01R 13/639; H01R 13/6581; H01R 13/748; H01R 11/11
See application file for complete search history.

(56) References Cited

U.S. PATENT DOCUMENTS

| | | | | | |
|---|---|---|---|---|---|
| 5,007,855 | A * | 4/1991 | O'Brien | H01R 4/2408 | 439/411 |
| 5,429,530 | A * | 7/1995 | Zander | H01R 4/2429 | 439/411 |
| 5,743,756 | A * | 4/1998 | Hasz | H01R 13/4367 | 439/364 |
| 5,800,201 | A * | 9/1998 | Takata | H01R 13/518 | 439/364 |
| 5,820,401 | A * | 10/1998 | Hasz | H01R 13/5221 | 439/364 |
| 6,520,781 | B2 * | 2/2003 | Koide | H01R 13/6592 | 439/97 |
| 6,716,071 | B2 * | 4/2004 | Miyazaki | H01R 13/748 | 439/421 |

(Continued)

*Primary Examiner* — Thanh Tam T Le
(74) *Attorney, Agent, or Firm* — Venjuris, P.C.

(57) ABSTRACT

A connector 10 includes a plurality of terminals 12, an inner housing 20 for holding the plurality of terminals 12, a tubular outer housing 30 for covering the inner housing 20, and a bolt B1 for fastening the inner housing 20 and the outer housing 30 by being inserted up to the inner housing 20 while being passed through the outer housing 30 from outside of the outer housing 30. The inner housing 20 is formed with a plurality of cavities 22 for respectively accommodating the plurality of terminals 12 and a recess for accommodating the bolt B1, and the plurality of cavities 22 and the recess are partitioned from each other.

9 Claims, 8 Drawing Sheets

(56) References Cited

U.S. PATENT DOCUMENTS

| | | | | |
|---|---|---|---|---|
| 7,481,664 | B1 * | 1/2009 | Knoll | H01R 13/648<br>439/359 |
| 7,695,333 | B2 * | 4/2010 | Strickland, Jr. | H01R 24/20<br>439/889 |
| 9,407,049 | B2 * | 8/2016 | Ishibashi | H01R 13/748 |
| 10,038,271 | B2 * | 7/2018 | Sakaguchi | H01R 13/512 |
| 10,340,626 | B2 * | 7/2019 | Kondo | H01R 13/5202 |
| 11,201,432 | B2 * | 12/2021 | Yamada | H01R 13/5208 |
| 2004/0106325 | A1 | 6/2004 | Miyazaki | |

* cited by examiner

CONNECTOR WITH INNER AND OUTER HOUSINGS

CROSS-REFERENCE TO RELATED APPLICATIONS

This application is based on and claims priority from Japanese Patent Application No. 2021-051900, filed on Mar. 25, 2021, with the Japan Patent Office, the disclosure of which is incorporated herein in their entireties by reference.

TECHNICAL FIELD

The present disclosure relates to a connector.

BACKGROUND

Japanese Patent Laid-open Publication No. 2004-172009 discloses a connector provided with a housing for holding terminal-equipped wires and a cover for covering the housing. In this connector, a pair of upper and lower halved members are mounted on an outer peripheral part of the housing while being united into a tubular shape, thereby serving as the cover.

SUMMARY

It is desired to firmly fix the housing (inner housing) and the cover (outer housing).

Accordingly, it is aimed to provide a technique capable of firmly fixing an inner housing and an outer housing.

The present disclosure is directed to a connector with a plurality of terminals, an inner housing for holding the plurality of terminals, a tubular outer housing for covering the inner housing, and a bolt for fastening the inner housing and the outer housing by being inserted up to the inner housing while being passed through the outer housing from outside of the outer housing, wherein the inner housing is formed with a plurality of cavities for respectively accommodating the plurality of terminals and a recess for accommodating the bolt, and the plurality of cavities and the recess are partitioned from each other.

According to the present disclosure, an inner housing and an outer housing are firmly fixed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
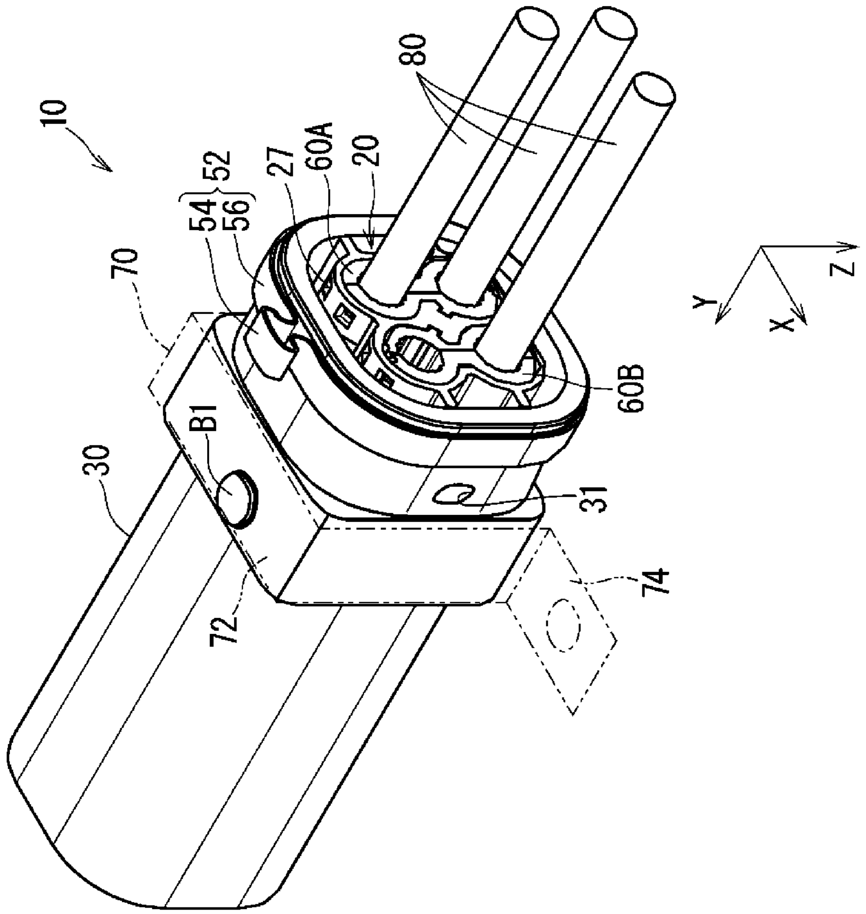
FIG. 1 is a perspective view showing a connector according to one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

The connector of the present disclosure is as follows.

(1) The connector of the present disclosure includes a plurality of terminals, an inner housing for holding the plurality of terminals, a tubular outer housing for covering the inner housing, and a bolt for fastening the inner housing and the outer housing by being inserted up to the inner housing while being passed through the outer housing from outside of the outer housing, wherein the inner housing is formed with a plurality of cavities for respectively accommodating the plurality of terminals and a recess for accommodating the bolt, and the plurality of cavities and the recess are partitioned from each other. The inner housing and the outer housing can be firmly fixed by the bolt. Further, since the plurality of cavities and the recess are partitioned from each other, a short circuit between the bolt and the terminals is suppressed.

(2) In the connector of (1), sets of the plurality of terminals and the plurality of cavities may be separately arranged in a plurality of columns and a plurality of rows, some of the plurality of cavities may overlap the recess when observed from an inserting direction of the bolt, and some of the others of the plurality of cavities may overlap the recess when observed from a direction orthogonal to both the inserting direction of the bolt and an inserting direction of the terminals. In this way, it is suppressed that the inner housing becomes longer in one direction. Further, by arranging the recess to overlap the cavities when observed from the two directions, the enlargement of the connector caused by providing a space for the bolt is suppressed.

(3) In the connector of (2), three sets of the terminals and the cavities may be provided, and three cavities may be arranged in an L shape and the recess may be provided in one empty corner of the inner housing where the three cavities are not provided when observed from the inserting direction of the terminals. In this way, an unnecessary space is less likely to be formed in the inner housing and the enlargement of the connector is suppressed.

(4) The connector of any one of (1) to (3) may include a sealing member provided between an outer surface of the inner housing and an inner surface of the outer housing, and the recess may be provided closer to a back surface side of the inner housing than the sealing member along an inserting direction of the terminals. Sealing can be provided between the outer surface of the inner housing and the inner surface of the outer housing on a side closer to a front surface than the recess.

(5) In the connector of any one of (1) to (4), the outer housing may be made of metal, the connector may comprise a shield member for covering wires extending from a back surface of the inner housing and a mounting member for mounting the shield member on the outer housing while electrically connecting the shield member to the outer housing, and the mounting member may be provided closer to a back surface side of the inner housing than the recess along an inserting direction of the terminals. In this way, the terminals and the wires can be shielded by the outer housing and the shield member.

(6) The connector of any one of (1) to (5) may include a first retainer and a second retainer for suppressing escape of the terminals by being mounted on a back surface side of the inner housing, the first and second retainers may be formed to have the same shape and respectively include a plurality of wire inserting portions, wires may be respectively inserted through the plurality of wire inserting portions of the first retainer, and the wire may not be inserted through the wire inserting portion at a position overlapping the recess when observed from an inserting direction of the terminals, out of the plurality of wire inserting portions of the second retainer. In this way, an increase in the number of types of components of the retainers can be suppressed.

(7) In the connector of (6), a plurality of ribs projecting toward the wire from an inner surface of the wire inserting portion may be provided in the wire inserting portion, and the plurality of ribs may contact the wire while being spaced apart in a circumferential direction of the wire. In this way, even if a vehicle vibrates, the retainers and the wires are less likely to rattle, whereby connected parts of the wires and the terminals are less likely to rattle.

(8) The connector of any one of (1) to (7) may include a bracket for fixing the connector to a fixing target, and the bracket may be mounted on the outer housing by the bolt. In this way, it is not necessary to separately provide a member for mounting the bracket on the connector and an increase in the number of components is suppressed. Further, since the inner housing, the outer housing and the bracket can be fixed at once by the bolt, an increase in the number of assembling steps of the connector can be suppressed.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

Embodiment

Figure 2:
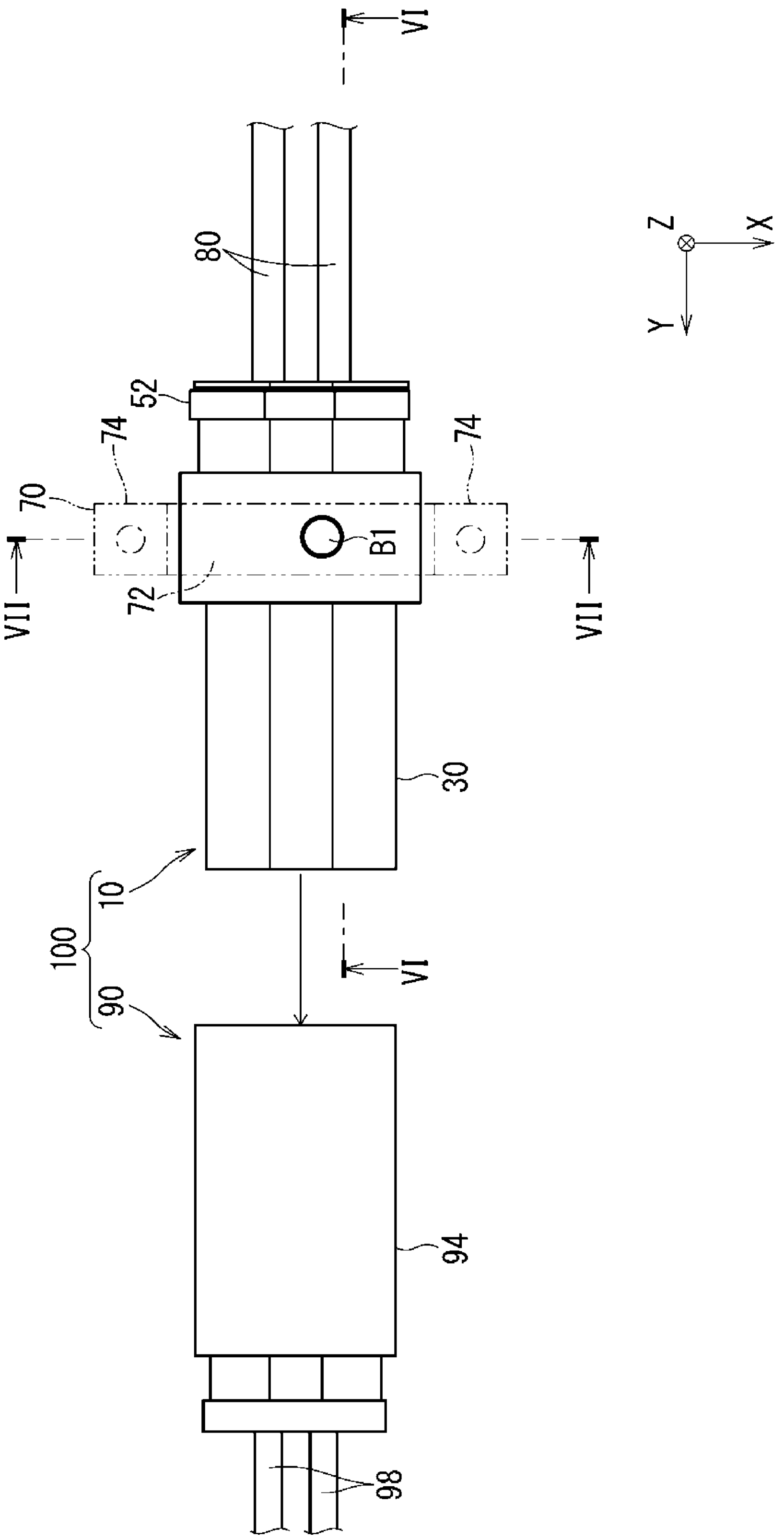
FIG. 2 is a plan view showing the connector according to the embodiment and a mating connector to be connected to the connector.
Figure 3:
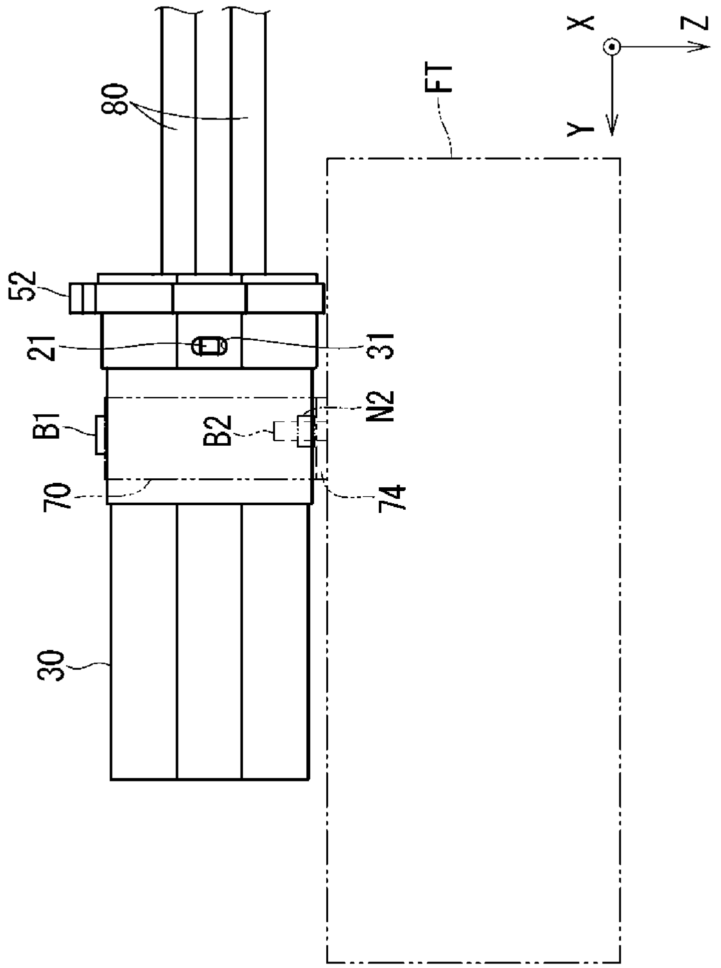
FIG. 3 is a side view showing the connector according to the embodiment.
Figure 4:
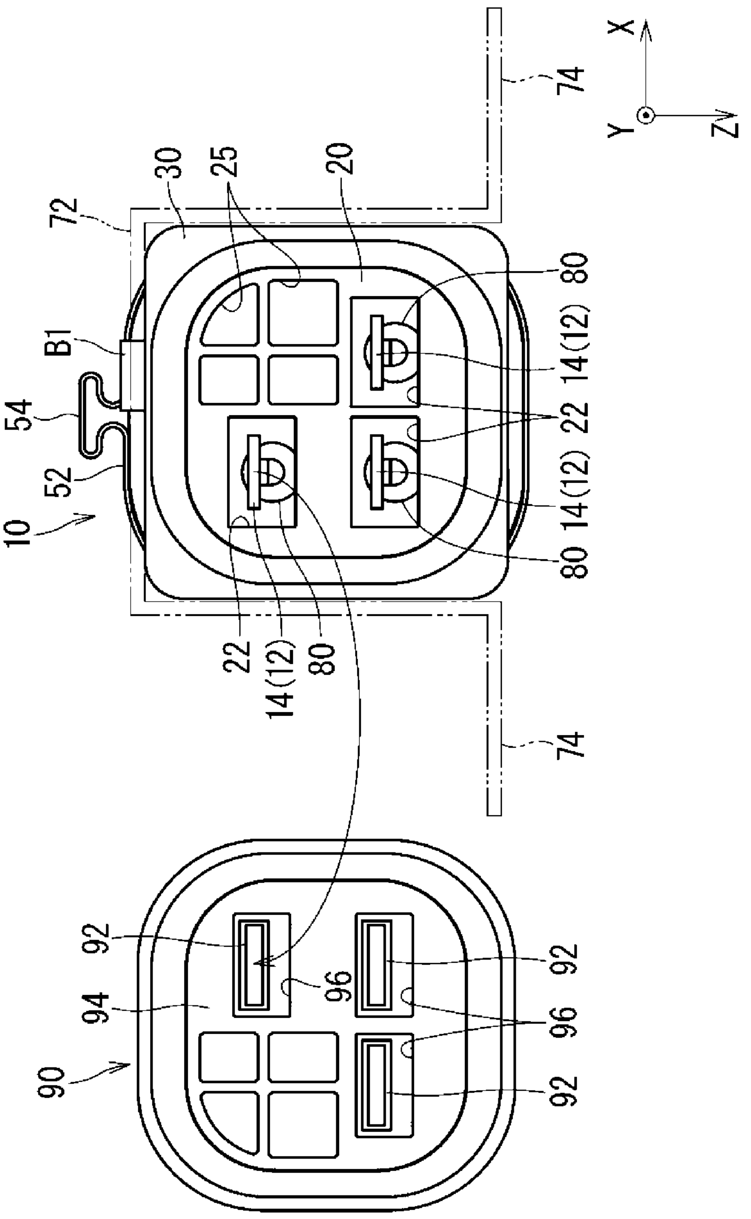
FIG. 4 is a front view showing connection surfaces of the connector according to the embodiment and the mating connector to be connected to the connector.
Figure 5:
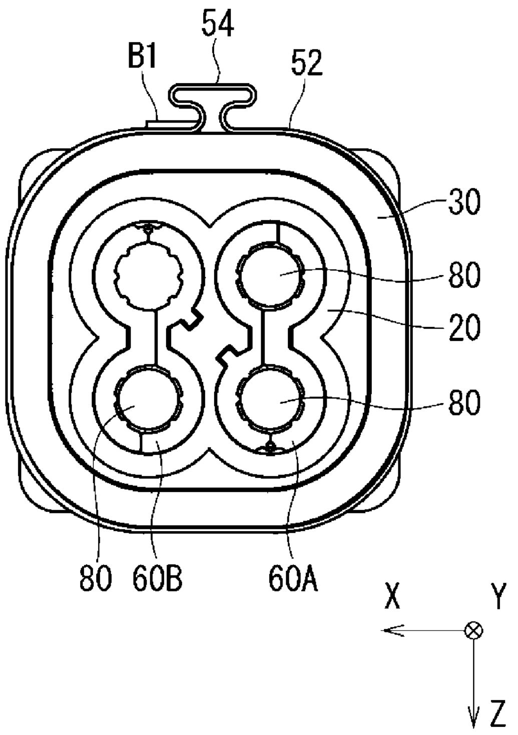
FIG. 5 is a back view showing the connector according to the embodiment.
Figure 6:
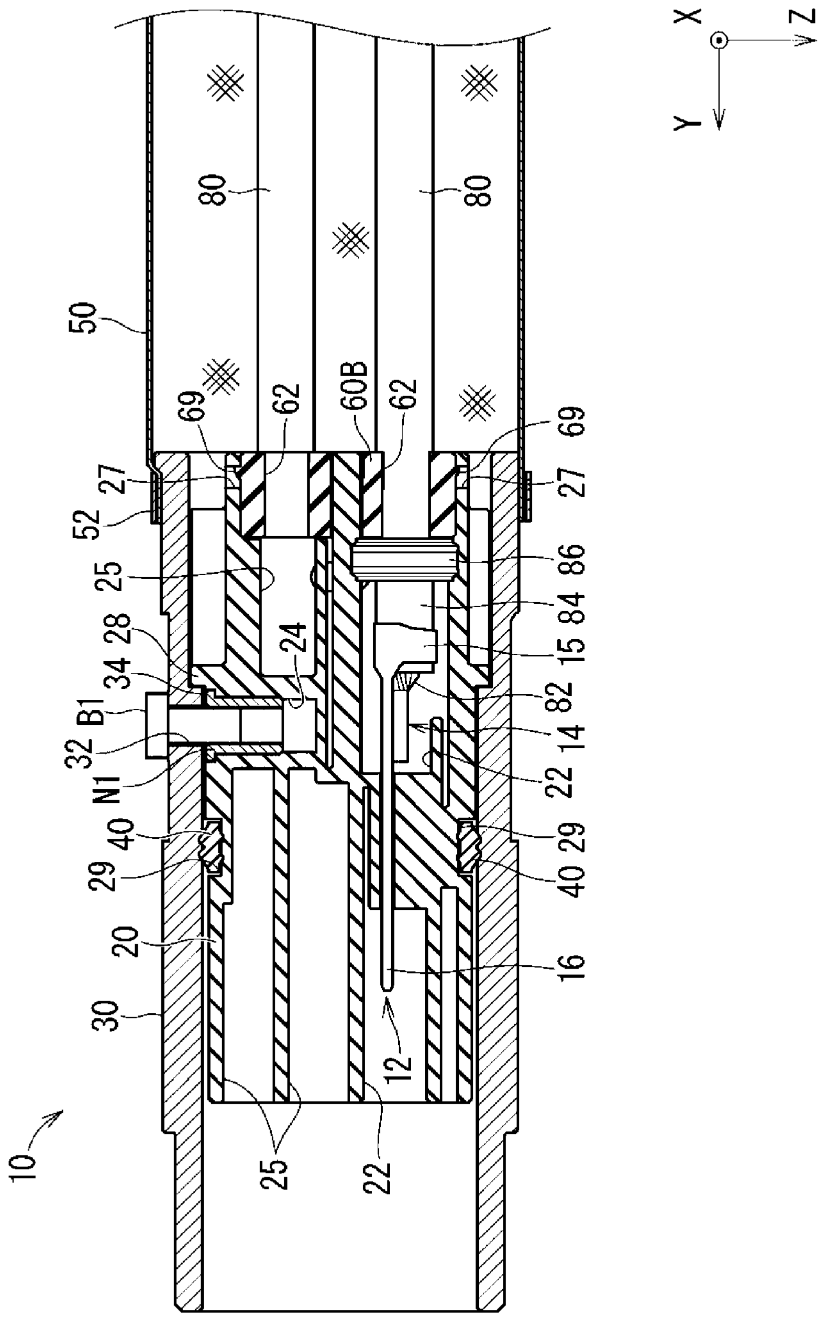
FIG. 6 is a section along VI-VI of FIG. 2.
Figure 7:
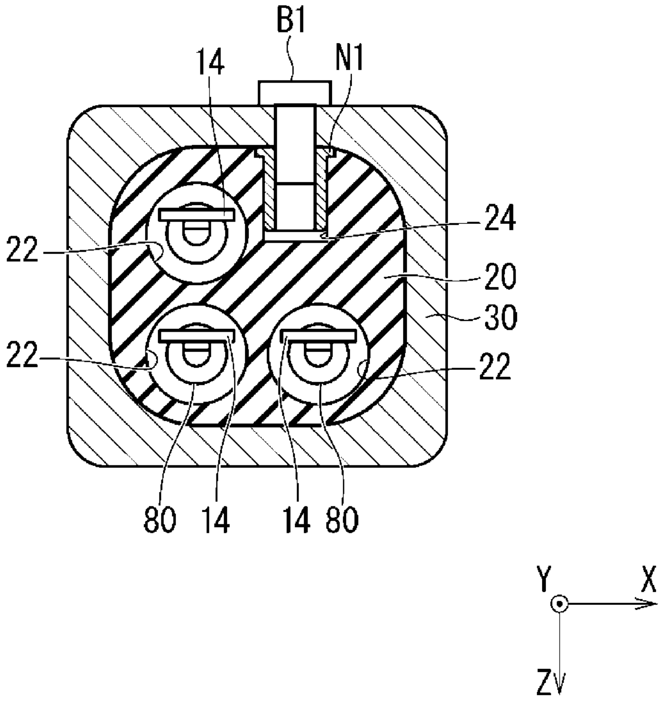
FIG. 7 is a section along VII-VII of FIG. 2.

Hereinafter, a connector according to one embodiment is described. FIG. 1 is a perspective view showing a connector 10 according to the embodiment. FIG. 2 is a plan view showing the connector 10 according to the embodiment and a mating connector 90 to be connected to the connector 10. FIG. 3 is a side view showing the connector 10 according to the embodiment. FIG. 4 is a front view showing the connector 10 according to the embodiment and the mating connector 90 to be connected to the connector 10. FIG. 5 is a back view showing the connector 10 according to the embodiment. FIG. 6 is a section along VI-VI of FIG. 2. FIG. 7 is a section along VII-VII of FIG. 2.

The connector 10 includes a plurality of terminals 12, an inner housing 20, an outer housing 30 and a bolt B1. The inner housing 20 holds the plurality of terminals 12. The outer housing 30 covers the inner housing 20. The bolt B1 fastens the inner housing 20 and the outer housing 30. The connector 10 of this example is provided on end parts of wires 80.

In the present disclosure, as shown in FIG. 2, a Y direction is a direction parallel to a connecting direction of the connector 10 and the mating connector 90, out of X, Y and Z directions orthogonal to each other. The Y direction is also an inserting direction of the inner housing 20 into the outer housing 30 and also an inserting direction of the terminals 12 into the inner housing 20. A surface (surface facing a positive side of the Y direction) of the inner housing 20 to be connected to the mating connector 90 is a front surface, and a surface (surface facing a negative side of the Y direction) opposite to the front surface is a back surface. Each component of the connector 10 is described using directions corresponding to the X, Y and Z directions in a mounted state even if this component is not mounted.

Each terminal 12 is connected to the wire 80. Each terminal 12 is also connected to a terminal 92 of the mating connector 90. The terminal 12 includes a wire connecting portion 14 and a mating-side connecting portion 16. For example, the terminal 12 is formed, such as by bending a metal plate. The wire connecting portion 14 is a part to be connected to the wire 80. The wire 80 is a coated wire 80 including a core 82 and an insulation layer 84. A part of the insulation layer 84 is stripped in an end part of the wire 80 to expose the core 82. Here, a welding portion 14 is provided as the wire connecting portion 14. The welding portion 14 is welded to the core 82. In this way, the welding portion 14 and the core 82 are fixed while being electrically connected. Here, the terminal is provided with a coating crimping portion 15. The coating crimping portion 15 is crimped to a part of the wire 80 where the insulation layer 84 is present. In this way, a holding force for the terminal 12 and the wire 80 is enhanced. Note that the wire connecting portion 14 needs not be the welding portion 14 and may be, for example, a core crimping portion. Further, the coating crimping portion 15 may be omitted. The mating-side connecting portion 16 is a part to be connected to the terminal 92 of the mating connector 90. Here, the mating-side connecting portion 16 is formed into a tab-like male terminal, and the mating terminal 92 is formed into a tubular female terminal. The mating-side connecting portion 16 may be formed into a tubular female terminal.

The inner housing 20 is formed with a plurality of cavities 22 and a bolt recess 24. The plurality of cavities 22 respectively accommodate the plurality of terminals 12. The plurality of terminals 12 are accommodated into predetermined cavities 22. The bolt recess 24 accommodates a tip part of the bolt B1. The inner housing 20 is, for example, formed of insulating resin. The inner housing 20 is, for example, an injection-molded article.

The plurality of cavities 22 and the bolt recess 24 are partitioned from each other. The bolt recess 24 is a bottomed hole. The bolt recess 24 is open only in the upper surface of the inner housing 20. No hole is formed in the inner surface of the bolt recess 24.

The outer housing 30 is formed into a tubular shape open on both ends. The inner housing 20 is inserted into the outer housing 30 through an opening in one end part. The outer housing 30 is formed with an insertion hole 32 through which the bolt B1 is inserted. Here, the outer housing 30 is made of metal. The outer housing 30 has a shielding property. The outer housing 30 may be made of resin.

The bolt B1 is inserted up to the inner housing 20 while being passed through the outer housing 30 from the outside of the outer housing 30. Here, the bolt B1 is inserted in the Z direction. The bolt B1 may be inserted in the X direction. The bolt B1 may be inserted in a direction intersecting the X and Z directions in an XZ plane. An intermediate part of the bolt B1 is accommodated in the insertion hole 32 of the outer housing 30. A tip part of the bolt B1 is accommodated in the bolt recess 24. A center axis of the bolt B1 along the X direction deviates from a center of the cavity 22 along the X direction overlapping the bolt recess 24 in the Z direction. The center axis of the bolt B1 along the X direction is closer to a central side of the inner housing 20 along the X direction than the center of the cavity 22 along the X direction. In this way, the bolt B1 can be fastened as close to the central side of the inner housing 20 as possible along the X direction.

A nut N1 to be fastened to the bolt B1 is provided in the bolt recess 24. For example, the inner housing 20 may be molded without using the nut N1 as an insert part and the nut N1 may be press-fit into the bolt recess 24. For example, the inner housing 20 may be insert-molded using the nut N1 as an insert part.

Sets of the plurality of terminals 12 and the plurality of cavities 22 are separately arranged in a plurality of columns and a plurality of rows. Note that the separate arrangement of the sets of the plurality of terminals 12 and the plurality of cavities 22 in the plurality of columns may be such that the sets of the terminals 12 and the cavities 22 are separately arranged in the plurality of columns at least in one row. Similarly, the separate arrangement of the sets of the plurality of terminals 12 and the plurality of cavities 22 in the plurality of rows may be such that the sets of the terminals 12 and the cavities 22 are separately arranged in the plurality of rows at least in one column. Here, a part where the sets of the terminals 12 and the cavities 22 are arranged along the Z direction is a column, and a part where the sets of the terminals 12 and the cavities 22 are arranged along the X direction is a row. Some cavities 22, out of the plurality of cavities 22, overlap the bolt recess 24 when observed from an inserting direction (Z direction) of the bolt B1. Some of the others of the plurality of cavities 22 overlap the bolt recess 24 when observed from a direction (X direction) orthogonal to both the inserting direction (Z direction) of the bolt B1 and the inserting direction (Y direction) of the terminals 12.

Here, three sets of the terminals 12 and the cavities 22 are provided. The three cavities 22 are arranged in an L shape when observed from the inserting direction (Y direction) of the terminals 12. The bolt recess 24 is provided in one empty corner of the inner housing 20 where the three cavities 22 are not provided. More particularly, the three sets of the terminals 12 and the cavities 22 are separately arranged in first and second columns Out of the three sets of the terminals 12 and the cavities 22, two sets of the terminals 12 and the cavities 22 are separately arranged in first and second rows in the first column. Out of the three sets of the terminals 12 and the cavities 22, one set of the terminal 12 and the cavity 22 is arranged in the first row in the second column. No set of the terminal 12 and the cavity 22 is arranged in the second row of the second column. The bolt recess 24 is formed at a position corresponding to the second row of the second column.

Lightening recesses 25 are also formed in the one empty corner of the inner housing where the set of the terminal 12 and the cavity 22 is not provided. The lightening recesses 25 are recessed toward the bolt recess 24 from each of the front and back surfaces of the inner housing 20. Since the lightening recesses 25 are bottomed holes, the lightening recesses 25 and the bolt recess 24 are also partitioned.

An insertion restricting portion for restricting the insertion of the inner housing 20 into the outer housing 30 more than a predetermined amount is provided on the back surface side of the bolt recess 24. The insertion restricting portion is constituted by a step portion 34 formed in the outer housing 30 and a flange portion 28 of the inner housing 20. The step portion 34 is formed by forming a part of the outer housing 30 where the insertion hole 32 is provided smaller than a part of the outer housing 30 closer to the back surface side than the former part. The flange portion 28 is formed by a part of the inner housing 20 closer to the back surface side than a part thereof where the bolt recess 24 is provided projecting more toward an outer peripheral side than the part where the bolt recess 24 is provided. A surface of the step portion 34 facing toward the negative side of the Y direction and a surface of the flange portion 28 facing toward the positive side of the Y direction contact, thereby restricting the insertion of the inner housing 20 into the outer housing 30 more than the predetermined amount. By providing the flange portion 28 and the bolt recess 24 at close positions in the Y direction, the bolt recess 24 and the insertion hole 32 can be positioned with high accuracy in the Y direction.

Further, the inner housing 20 and the outer housing 30 can be locked to each other by a locking projection 21 and a locking recess 31 in a state before the bolt B1 is fastened. In this way, the bolt B1 is easily fastened. The locking projection 21 is provided on the outer surface of the inner housing 20. The locking recess 31 is in the form of a through hole formed in the outer housing 30. Of course, the locking projection 21 and the locking recess 31 may not be provided.

The connector 10 of this example further includes a sealing member 40, a shield member 50, a mounting member 52, retainers 60 and a bracket 70. Note that the sealing member 40, the shield member 50, the mounting member 52, the retainers 60 and the bracket 70 are shown only in some of the figures and are not shown in the other figures.

The sealing member 40 is shown in FIG. 6. The sealing member 40 is provided between the outer surface of the inner housing 20 and the inner surface of the outer housing 30. The sealing member 40 is, for example, formed into a ring shape by a resilient material such as elastomer. The sealing member 40 is, for example, a rubber ring. The sealing member 40 is mounted on the outer surface of the inner housing 20. The sealing member 40 projects further outward than the outer surface of the inner housing 20. The sealing member 40 is compressed and deformed by being squeezed between the outer surface of the inner housing 20 and the inner surface of the outer housing 30.

An annular groove 29 is formed about an axis parallel to the Y direction in the outer surface of the inner housing 20. By mounting the sealing member 40 into this groove 29, a positional displacement of the sealing member 40 along the Y direction is suppressed. In this example, the inner housing 20 with the sealing member 40 is inserted into the outer housing 30 with the sealing member 40 mounted on the outer surface of the inner housing 20. At this time, even if a friction force is generated along the Y direction between the sealing member 40 and the outer housing 30, a positional displacement of the sealing member 40 is suppressed since the sealing member 40 is accommodated in the groove 29.

The groove 29 is provided closer to a front surface side of the inner housing 20 than the bolt recess 24 along the inserting direction of the terminals 12. Accordingly, the bolt recess 24 is provided closer to the back surface side of the inner housing 20 than the sealing member 40 along the inserting direction of the terminals 12.

The shield member 50 and the mounting member 52 are shown in FIG. 6. The shield member 50 covers the wires 80 extending from the back surface of the inner housing 20. One end part of the shield member 50 is put on the outer housing 30. The shield member 50 is, for example, a metal braided wire formed by braiding a plurality of strands made of metal into a tubular shape. The tubular metal braided wire is easily deformed to change the size of the tubular shape. The metal braided wire is flexible to be able to follow the bending of the wires 80.

The mounting member 52 mounts the shield member 50 on the outer housing 30 while electrically connecting the shield member 50 to the outer housing 30. The mounting member 52 is provided closer to the back surface side of the inner housing 20 than the bolt recess 24 along the inserting direction of the terminals 12. The mounting member 52 is mounted on an end part of the outer housing 30. The mounting member 52 is a crimping member. The mounting member 52 is crimped around a part where the shield member 50 is put on the outer housing 30. The shield member 50 is sandwiched between the outer housing 30 and the mounting member 52. The mounting member 52 fixes the shield member 50 to the outer housing 30. The mounting member 52 electrically connects the shield member 50 and the outer housing 30.

The mounting member 52 includes a ring portion 54 and a projecting portion 56. The ring portion 54 is in close contact with and around a part to be crimped (here, the shield member 50). The ring portion 54 sandwiches and holds the shield member 50 between the outer housing 30 and the ring portion 54. The projecting portion 56 is a circumferential part of the ring portion 54 projecting toward an outer peripheral side. For example, the mounting member 52 is formed by crimping and deforming a ring-shaped member made of metal, larger than the outer housing 30 and including the ring portion 54 to have the ring portion 54 and the projecting portion 56. When the mounting member 52 is crimped, the projecting portion 56 is plastically deformed to reduce a diameter of the ring portion 54.

Figure 8:
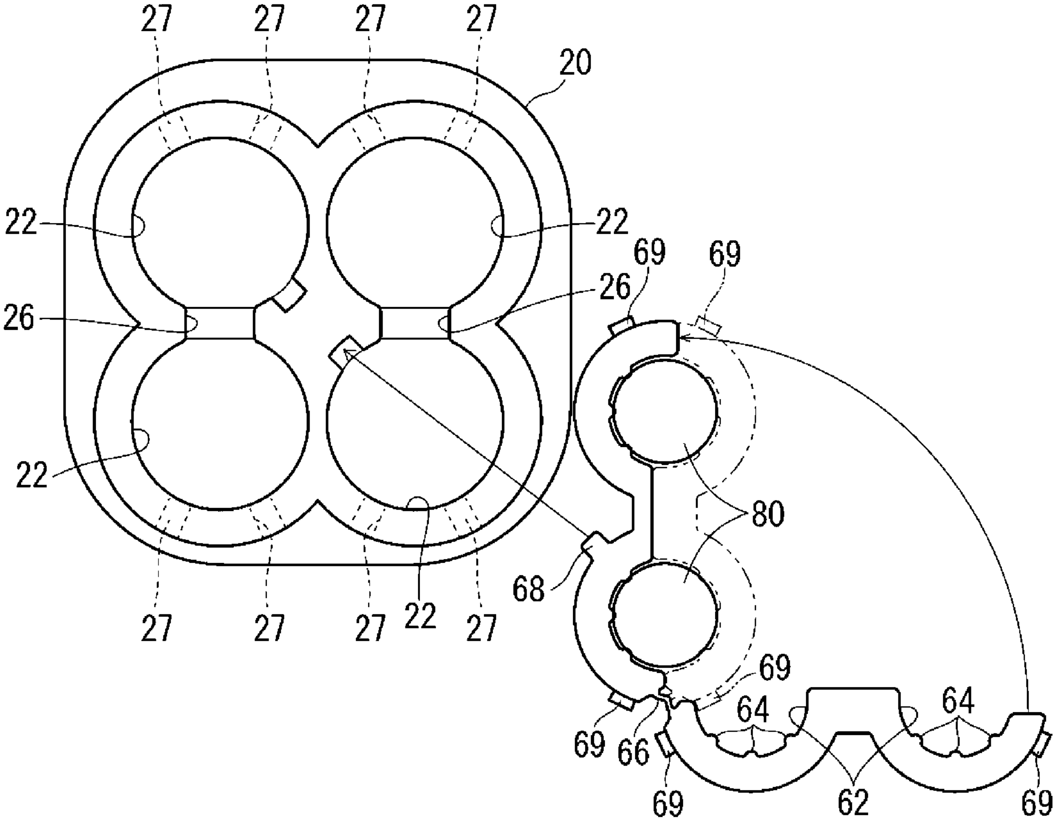
FIG. 8 is an exploded back view showing a retainer and an inner housing.

The retainers 60 are shown in FIGS. 1, 5 and 6. The retainers 60 are described with reference to FIG. 8 in addition to these figures. FIG. 8 is an exploded back view showing the retainer 60 and the inner housing 20.

The retainers 60 are mounted on the back surface side of the inner housing 20 to suppress the escape of the terminals 12. A first retainer 60A and a second retainer 60B are provided as the retainers 60. The first and second retainers 60A, 60B are formed to have the same shape. Each retainer 60 includes a plurality of (here, two) wire inserting portions 62. The wires 80 are inserted through the two wire inserting portions 62 of the first retainer 60A. The wire 80 is inserted through one of the two wire inserting portions 62 of the second retainer 60B, but the wire 80 is not inserted through the other wire inserting portion 62. The wire inserting portion 62 through which the wire 80 is not inserted is arranged at a position overlapping the bolt recess 24 when observed from the inserting direction (Y direction) of the terminals 12.

A plurality of (here, six) ribs 64 are provided in the wire inserting portion 62. Each rib 64 projects toward the wire 80 from the inner surface of the wire inserting portion 62. The six ribs 64 contact the wire 80 while being spaced apart from each other in a circumferential direction of the wire 80. In this way, the wires 80 are firmly held by the retainers 60.

The retainer 60 of this example includes two halved bodies. Each halved body has a part obtained by halving the two wire inserting portions 62. The two halved bodies are united to form the retainer 60. In this way, the retainer 60 can be easily mounted on the wire(s) 80. One end parts of the two halved bodies are openably and closably coupled by a hinge 66.

A plurality of projections 68, 69 are provided on the outer surfaces of the wire inserting portions 62. One projection 68 is a positioning projection 68 indicating the orientation of the retainer 60. Four projections 69 are locking projections 69 for locking the retainer 60 to the inner housing 20.

Retainer recesses 26 for holding the retainers 60 are formed in the back surface of the inner housing 20. The retainer recess 26 is formed into a shape corresponding to the plurality of wire inserting portions 62 and one projection 68. The retainer recess 26 is constituted by openings of two cavities 22, a part recessed between the openings of the two cavities 22 and a part partially recessed around one cavity 22. Locking recesses 27 to be locked to the projections 69 are formed inwardly of the back surface of the inner housing 20. The projections 69 are locked to the locking recesses 27, whereby the retainer 60 is mounted on the back surface of the inner housing 20. The opening of the halved bodies is suppressed by locking the projections 69 to the locking recesses 27 while accommodating the retainer 60 into the retainer recess 26.

As shown in FIG. 6, rubber plugs 86 are mounted on the wires 80. The rubber plugs 86 are mounted between the terminals 12 and the retainers 60 along the inserting direction (Y direction) of the terminals 12 on the wires 80. The inner housing 20 is provided with walls which project from the inner surfaces of the cavities 22 and come into contact with the front surfaces of the rubber plugs 86. The back surfaces of the rubber plugs 86 are in contact with the retainers 60. By these, the rubber plugs 86 are positioned in the inserting direction (Y direction) of the terminals 12.

The bracket 70 is shown in FIGS. 1 to 4. The bracket 70 is a member for fixing the connector 10 to a fixing target FT. The fixing target FT is, for example, a casing or panel arranged near the connector 10. The bracket 70 may be made of metal or made of resin. In the case of electrically connecting the fixing target FT and the outer housing 30, the bracket 70 may be made of metal.

The bracket 70 includes a first fixing portion 72 and second fixing portions 74. The first fixing portion 72 is a part to be fixed to the connector 10. The second fixing portions 74 are parts to be fixed to the fixing target FT. The bracket 70 is mounted on the outer housing 30 by the bolt B1. The first fixing portion 72 is formed with a through hole through which the bolt B1 is insertable. Here, the bracket 70 is fixed to the fixing target FT by bolts B2 and nuts N2 different from the bolt B1 and the nut N1. The second fixing portion 74 is formed with a through hole through which the bolt B2 is insertable. The bracket 70 is shaped by bending a plate material. The first fixing portion 72 is formed into a U shape along the outer surface of the connector 10. The second fixing portions 74 project outward (here, outward along the X direction) from both end parts of the first fixing portion 72. Of course, the bracket 70 may be fixed to the fixing target FT by other than the bolts B2.

A connector device 100 and the mating connector 90 are described with reference to FIGS. 2 and 4.

The connector device 100 includes the connector 10 and the mating connector 90. The connector 10 and the mating connector 90 are fit and electrically connected to each other. In this example, the mating connector 90 is also provided on end parts of mating wires 98. Accordingly, the connector device 100 connects the wires 80, 98 to each other. The connector device 100 is a so-called wire-to-wire connector device. A housing 94 of the mating connector 90 is formed with a plurality of cavities 96. An array of the plurality of cavities 96 corresponds to that of the plurality of cavities 22 in the connector 10. More particularly, as shown in FIG. 4, the array of the cavities 22 of the connector 10 and that of the cavities 96 of the mating connector 90 are line-symmetrical when a connection surface (front surface) of the connector 10 and a connection surface (front surface) of the mating connector 90 are observed. In the housing 94 of the mating connector 90, no cavity 96 is formed in a part corresponding to the bolt recess 24 of the connector 10.

<Effects>

According to the connector 10 configured as described above, the inner housing 20 and the outer housing 30 can be firmly fixed by the bolt B1. Further, since the plurality of cavities 22 and the bolt recess 24 are partitioned from each other, a short circuit between the bolt B1 and the terminals 12 is suppressed.

Further, since the sets of the plurality of terminals 12 and the plurality of cavities 22 are separately arranged in the plurality of columns and the plurality of rows, it is suppressed that the inner housing 20 becomes longer in one direction. Further, the recess is arranged to overlap the cavities 22, thereby suppressing the enlargement of the connector 10 caused by providing a space for the bolt B1.

Three terminals 12 are provided and, when observed from the inserting direction of the terminals 12, the plurality of cavities 22 are arranged in an L shape and the bolt recess 24 is provided in one empty corner of the inner housing 20 where the plurality of cavities 22 are not provided. In this way, an unnecessary space is less likely to be formed in the inner housing 20 and the enlargement of the connector 10 is suppressed.

Further, the sealing member 40 is provided between the outer surface of the inner housing 20 and the inner surface of the outer housing 30, and the bolt recess 24 is provided closer to the back surface side of the inner housing 20 than the sealing member 40 along the inserting direction of the terminals 12. In this way, sealing can be provided between the outer surface of the inner housing 20 and the inner surface of the outer housing 30 on a side closer to the front surface than the bolt recess 24.

Further, the outer housing 30 is made of metal, the connector 10 includes the shield member 50 for covering the wires 80 extending from the back surface of the inner housing 20 and the mounting member 52 for mounting the shield member 50 on the outer housing 30 while electrically connecting the shield member 50 and the outer housing 30, and the mounting member 52 is provided closer to the back surface side of the inner housing 20 than the bolt recess 24 along the inserting direction of the terminals 12. In this way, the terminals 12 and the wires 80 can be shielded by the outer housing 30 and the shield member 50.

Further, the first and second retainers 60A, 60B are formed to have the same shape, the wires 80 are respectively inserted through the plurality of wire inserting portions 62 of the first retainer 60A, and the wire 80 is not passed through the wire inserting portion 62 at the position overlapping the recess when observed from the inserting direction of the terminals 12, out of the plurality of wire inserting portions 62 of the second retainer 60B. In this way, an increase in the types of components of the retainers 60 can be suppressed.

Further, the wire inserting portion 62 is provided with the plurality of ribs 64 projecting toward the wire 80 from the inner surface thereof, and the plurality of ribs 64 contact the wire 80 while being spaced apart in the circumferential direction of the wire 80. In this way, even if a vehicle vibrates, the retainers 60 and the wires 80 are less likely to rattle, whereby connected parts of the wires 80 and the terminals 12 are less likely to rattle.

Further, the bracket 70 is provided to fix the connector 10 to the fixing target FT, and the bracket 70 is mounted on the outer housing 30 by the bolt B1. In this way, it is not necessary to separately provide a member for mounting the bracket 70 on the connector 10 and an increase in the number of components is suppressed. Further, since the inner housing 20, the outer housing 30 and the bracket 70 can be fixed at once by the bolt B1, an increase in the number of assembling steps of the connector 10 can be suppressed.

[Modifications]

Although the plurality of terminals 12 are separately arranged in the plurality of columns and the plurality of rows in the above description, this is not essential. The plurality of terminals 12 may be arranged in one column and a plurality of rows. Further, even if the plurality of terminals 12 are separately arranged in the plurality of columns and the plurality of rows, it is not essential that the bolt recess 24 and some cavities 22 overlap when observed from each of the X and Z directions. The bolt recess 24 may not overlap the cavities 22 when observed from the X or Z direction.

Further, although three sets of the terminals 12 and the cavities 22 are provided, the plurality of cavities 22 are arranged in an L shape and the bolt recess 24 is provided in the one empty corner of the inner housing 20 where the plurality of cavities 22 are not prevented in the above description, this is not essential. Four or more sets of the terminals 12 and the cavities 22 may be provided. For example, the bolt recess 24 may be formed at one outermost location, out of locations set in m columns and n rows (m, n are integers equal to or greater than 2), and the terminals 12 and the cavities 22 may be arranged in other locations.

Further, although the connector 10 includes the sealing member 40 in the above description, this is not essential. The connector 10 may not include the sealing member 40. Further, even if the connector 10 includes the sealing member 40, it is not essential that the bolt recess 24 is provided closer to the back surface side of the inner housing 20 than the sealing member 40 along the inserting direction (Y direction) of the terminals 12. For example, the sealing member 40 may be provided closer to the back surface side of the inner housing 20 than the bolt recess 24 along the inserting direction (Y direction) of the terminals 12.

Further, although the connector 10 includes the shield member 50 and the mounting member 52 in the above description, this is not essential. The connector 10 may not include the shield member 50 and the mounting member 52. Further, even if the connector 10 includes the shield member 50 and the mounting member 52, it is not essential that the mounting member 52 is provided closer to the back surface side of the inner housing 20 than the bolt recess 24 along the inserting direction (Y direction) of the terminals 12. The bolt recess 24 may be provided closer to the back surface side of the inner housing 20 than the mounting member 52 along the inserting direction (Y direction) of the terminals 12. The bolt recess 24 and the mounting member 52 may be located at the same position along the inserting direction (Y direction) of the terminals 12.

Further, although the connector 10 includes the retainers 60 in the above description, this is not essential. The connector 10 may not include the retainers 60. Further, even if the connector 10 includes the retainers 60, it is not essential that the first and second retainers 60A, 60B having the same shape are provided. For example, a retainer having only one wire inserting portion 62 may be provided instead of the second retainer 60B. Further, all the plurality of wires 80 may be, for example, passed through one retainer. Further, even if the connector 10 includes the retainers 60, it is not essential that each wire inserting portion 62 is provided with the plurality of ribs 64. The plurality of ribs 64 may be omitted from the wire inserting portion 62.

Further, although the connector 10 includes the bracket 70 in the above description, this is not essential. The connector 10 may not include the bracket 70. Further, even if the connector 10 includes the bracket 70, it is not essential that the bracket 70 is mounted on the outer housing 30 by the bolt B1. The bracket 70 may be mounted on the outer housing 30 by a fixing means other than the bolt B1. Further, parts corresponding to the second fixing portions 74 of the bracket 70, i.e. parts to be fixed to the fixing target FT, may be provided as parts of the outer housing 30 in advance.

Note that the respective configurations described in the above embodiment and respective modifications can be combined as appropriate as long as these configurations do not contradict each other.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

a plurality of terminals;

an inner housing configured to hold the plurality of terminals;

a tubular outer housing made of metal and configured to cover the inner housing;

a shield member configured to cover wires extending from a back surface of the inner housing;

a mounting member configured to mount the shield member on the outer housing while electrically connecting the shield member to the outer housing; and a bolt configured to fasten the inner housing and the outer housing by being inserted up to the inner housing while being passed through the outer housing from outside of the outer housing, wherein:

the inner housing is formed with a plurality of cavities that respectively accommodate the plurality of terminals and a recess that accommodates the bolt, the plurality of cavities and the recess are partitioned from each other, and the mounting member is provided closer to a back surface side of the inner housing than the recess along an inserting direction of the terminals.

2. The connector of claim 1, wherein:

sets of the plurality of terminals and the plurality of cavities are separately arranged in a plurality of columns and a plurality of rows, some of the plurality of cavities overlap the recess when observed from an inserting direction of the bolt, and some of others of the plurality of cavities overlap the recess when observed from a direction orthogonal to both the inserting direction of the bolt and an inserting direction of the terminals.

3. The connector of claim 2, wherein:

three sets of the terminals and the cavities are provided, and three cavities are arranged in an L shape and the recess is provided in one empty corner of the inner housing where the three cavities are not provided when observed from the inserting direction of the terminals.

4. The connector of claim 1, comprising a sealing member provided between an outer surface of the inner housing and an inner surface of the outer housing, wherein:

the recess is provided closer to a back surface side of the inner housing than the sealing member along an inserting direction of the terminals.

5. The connector of claim 1, comprising a first retainer and a second retainer configured to suppress escape of the terminals by being mounted on a back surface side of the inner housing, wherein:

the first and second retainers are formed to have a same shape and respectively include a plurality of wire inserting portions, wires are respectively inserted through the plurality of wire inserting portions of the first retainer, and the wire is not inserted through a wire inserting portion at a position overlapping the recess when observed from an inserting direction of the terminals, out of the plurality of wire inserting portions of the second retainer.

6. The connector of claim 5, wherein:

a plurality of ribs projecting toward the wire from an inner surface of the wire inserting portion are provided in the wire inserting portion, and the plurality of ribs contact the wire while being spaced apart in a circumferential direction of the wire.

7. The connector of claim 1, comprising a bracket configured to fix the connector to a fixing target, wherein:

the bracket is mounted on the outer housing by the bolt.

8. A connector, comprising:

a plurality of terminals;

an inner housing configured to hold the plurality of terminals;

a tubular outer housing configured to cover the inner housing;

a bolt configured to fasten the inner housing and the outer housing by being inserted up to the inner housing while being passed through the outer housing from outside of the outer housing; and a first retainer and a second retainer configured to suppress escape of the terminals by being mounted on a back surface side of the inner housing, wherein:

the inner housing is formed with a plurality of cavities that respectively accommodate the plurality of terminals and a recess that accommodates the bolt, the plurality of cavities and the recess are partitioned from each other, the first and second retainers are formed to have a same shape and respectively include a plurality of wire inserting portions, wires are respectively inserted through the plurality of wire inserting portions of the first retainer, the wire is not inserted through a wire inserting portion at a position overlapping the recess when observed from an inserting direction of the terminals, out of the plurality of wire inserting portions of the second retainer, a plurality of ribs projecting toward the wire from an inner surface of the wire inserting portion are provided in the wire inserting portion, and the plurality of ribs contact the wire while being spaced apart in a circumferential direction of the wire.

9. A connector, comprising:

a plurality of terminals;

an inner housing configured to hold the plurality of terminals;

a tubular outer housing configured to cover the inner housing;

a bolt configured to fasten the inner housing and the outer housing by being inserted up to the inner housing while being passed through the outer housing from outside of the outer housing; and a bracket configured to fix the connector to a fixing target, wherein:

the inner housing is formed with a plurality of cavities that respectively accommodate the plurality of terminals and a recess that accommodates the bolt, the plurality of cavities and the recess are partitioned from each other, and the bracket is mounted on the outer housing by the bolt.

* * * * *